US008539060B2

(12) United States Patent
Zhang et al.

(10) Patent No.: US 8,539,060 B2
(45) Date of Patent: Sep. 17, 2013

(54) SYSTEM POSITIONING SERVICES IN DATA CENTERS

(75) Inventors: Hui Zhang, New Brunswick, NJ (US); Kenji Yoshihira, Princeton Junction, NJ (US); Ya-Yunn Su, Taipei (TW); Guofei Jiang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 340 days.

(21) Appl. No.: 13/112,096

(22) Filed: May 20, 2011

(65) Prior Publication Data

US 2012/0151490 A1    Jun. 14, 2012

Related U.S. Application Data

(60) Provisional application No. 61/421,675, filed on Dec. 10, 2010.

(51) Int. Cl.
  *G06F 15/177*  (2006.01)
  *G06F 15/173*  (2006.01)
(52) U.S. Cl.
  USPC .......................... 709/223; 709/224; 709/226
(58) Field of Classification Search
  USPC .......................................... 709/221, 224, 226
  See application file for complete search history.

(56) References Cited

U.S. PATENT DOCUMENTS

| | | | | |
|---|---|---|---|---|
| 2012/0131591 | A1* | 5/2012 | Moorthi et al. | 718/104 |
| 2013/0086589 | A1* | 4/2013 | Levien et al. | 718/102 |
| 2013/0097293 | A1* | 4/2013 | Gibson et al. | 709/221 |

OTHER PUBLICATIONS

Riska et al., Automatic Exploration of Trade-offs between Power and Performance in Disk Drives, Jun. 7, 2010, pp. 131-140.*
Sankar et al., Sensitivity Based Power Management of Enterprise Storage Systems, 2008, pp. 1-10.*
Sankar et al. Addressing the Stranded Power Problem in Datacenters using Workload Characterization, Jan. 2010, pp. 217-222.*
Kumar, S., et al., "Vmanage: Loosely Coupled Platform and Virtualization Management in Data Centers", Proceedings of the 6th International Conference on Autonomic Computing, ICAC 2009, Jun. 2009. (10 Pages).
Steinder, M. et al., "Coordinated Management of Power Usage and Runtime Performance", IEEE/IFIP Network Operations and Management Symposium: Pervasive Management for Ubioquitous Networks and Services, NOMS 2008, Apr. 2008, pp. 387-394.

* cited by examiner

*Primary Examiner* — Larry Donaghue
(74) *Attorney, Agent, or Firm* — Joseph Kolodka

(57) ABSTRACT

A system and method are disclosed for managing a data center in terms of power and performance. The system includes at least one system positioning application for managing power costs and performance costs at a data center. The at least one system positioning application may determine a status of a data center in terms of power costs and performance costs or generate configurations to automatically implement a desired target state at the data center. A system configuration compiler is configured to receive a request from the system positioning application associated with a data center management task, convert the request into a set of subtasks, and schedule execution of the subtasks to implement the data center management task.

20 Claims, 7 Drawing Sheets

SYSTEM POSITIONING SERVICES IN DATA CENTERS

RELATED APPLICATION INFORMATION

This application claims priority to provisional application Ser. No. 61/421,675 filed on Dec. 10, 2010, the entirety of which is herein incorporated by reference.

BACKGROUND

1. Technical Field

The present invention relates to virtualized data center management, and more particularly, to a middleware architectural scheme which provides integrated power and performance management in a virtualized data center.

2. Description of the Related Art

While there has been significant industry investment and much effort expended on improving techniques for managing data centers, prior attempts have been insufficient for a number of reasons. One of the primary pitfalls associated with prior art data center management techniques relates to the fact that a number of separate solutions have been designed in isolation. For example, while solutions may have been proposed to handle platform management optimizations (e.g., server configuration optimizations) and virtualization optimizations (e.g., optimizing virtual machine provisioning), there has been no integration among these different solutions. Consequently, prior art data center management techniques often produce redundant, or even conflicting, operational decisions. This decreases the efficiency and stability of such systems.

Other deficiencies associated with prior art data center management systems stem from the fact that these systems are not declarative in nature. Providing a data center management system with this type of capability proves difficult for a number of reasons. There has been no suitable model developed for such data center management scheme. In addition, implementing such a system requires more than merely focusing on the target state or target requirements. Rather, the system must also consider the transitional states leading up to the target state, and account for potential errors which may arise during the transitional period.

SUMMARY

In accordance with the present principles, a system is provided for managing a data center. The system includes a system positioning module stored on a computer readable storage medium. The system positioning module is comprised of a position reporting module which is configured to determine a status of a data center under specified configuration parameters, and a destination searching module configured to receive a desired target state and automatically determine configuration parameters that are to be adjusted if the desired target state is implemented at the data center. The system further comprises a system configuration compiler configured to receive a request from the system positioning module associated with a data center management task, convert the request into a set of subtasks, and schedule execution of the subtasks to implement the data center management task.

In accordance with the present principles, a method is also disclosed for managing a data center. A request associated with a system positioning application is sent. The request may be for one of determining a status of a data center under specified configuration parameters, determining configuration parameters that are to be adjusted if a desired target state is implemented at the data center, or implementing an auto-piloting service for automatically controlling the data center. The request is converted into a set of subtasks and the subtasks are scheduled for execution to implement the request.

In accordance with the present principles, another system is provided for managing a data center. The system includes a system positioning module stored on a computer readable storage medium. The system positioning module is comprised of an auto-piloting module configured to automatically apply configuration settings to a data center using a sensitivity-based optimization technique to control the data center in terms of power and performance. The system further comprises a system configuration compiler configured to receive a request from the system positioning module associated with a data center management task, convert the request into a set of subtasks, and schedule execution of the subtasks to implement the data center management task.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
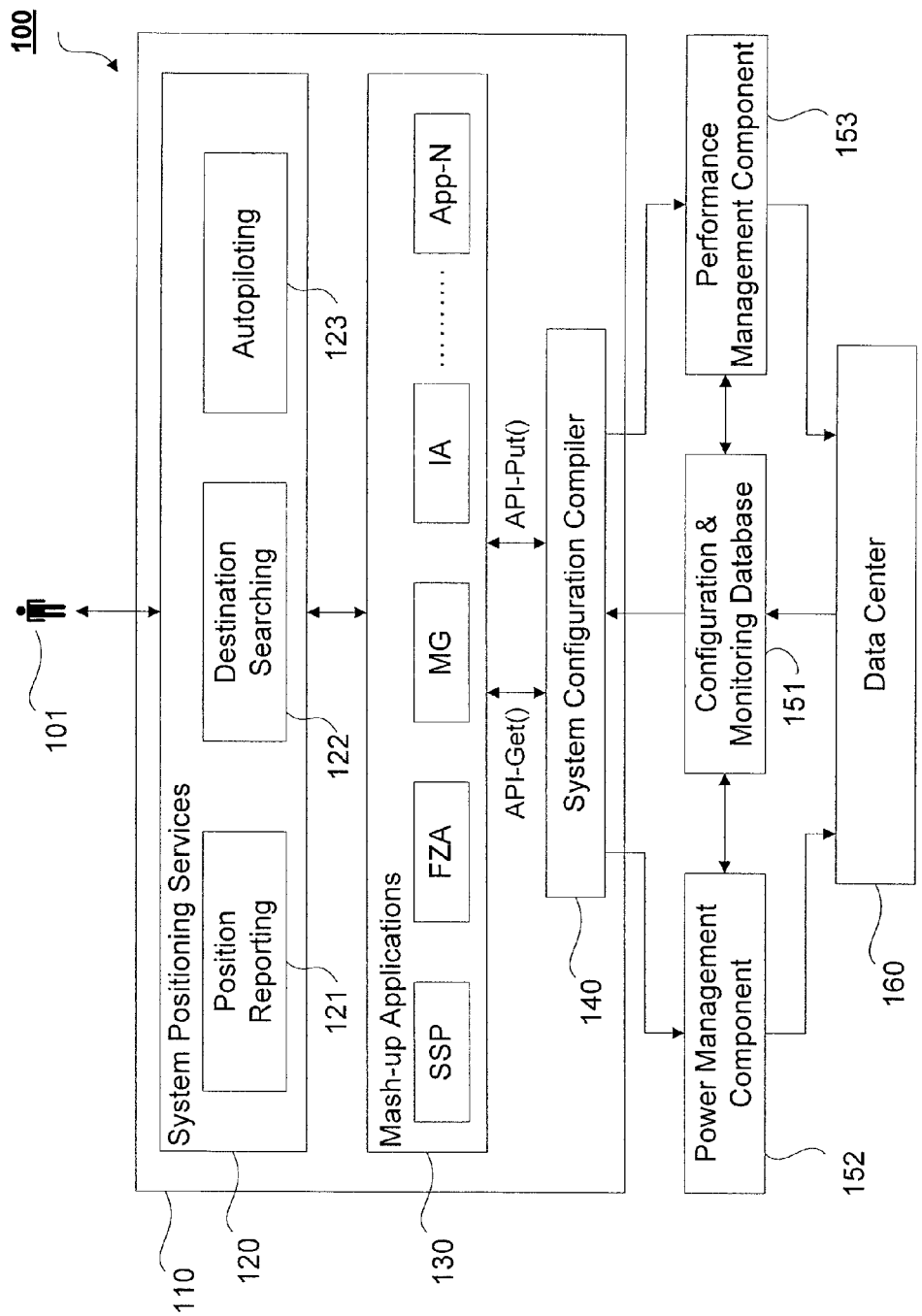
FIG. 1 is a block/flow diagram illustrating a data center management system in accordance with the present principles.

In accordance with the present principles, an integrated solution is disclosed for managing the power and performance configurations of a data center. A middleware system is situated between end-users (e.g., data center operators) and a set of components for controlling the power and performance of the data center. A set of system positioning services provides reporting data on the state of the system, permits end-users to configure and control the system (e.g., by specifying system performance and power cost targets) and determines the appropriate management configurations and settings that are able to drive the system to a desired input state which may be specified by the end-user. The results of the system positioning services are presented to the end user via an interface, e.g., a global positioning system (GPS)-like user interface.

The middleware solution described herein has a layered design which may be comprised of three different layers: a first layer comprising a system configuration compiler, a second layer comprising a set of mash-up applications, and a third layer comprising a set of system positioning services. The system configuration compiler interacts with components for controlling the power and performance of a data center. In one embodiment, two primary application programming interface (API) functions are provided for positioning of the system. However, additional API functions may also be provided.

A first API function, API-Get( ), provides a report on where the system would be located (e.g., in terms of power, performance and operational cost) if certain workload and system settings were implemented at the data center. The second API function, API-Put( ), determines a set of management policies and configurations that permit the system to reach a specified input status.

The mash-up applications may represent management subtasks that can be built on top of the API functions to implement certain functions. For example, exemplary mash-up applications may utilize these the API functions to provide functionality relating to system status prediction, feasibility zone analysis, impact analysis applications, and map generation (each of which is explained in further detail below).

The results generated by the mash-up applications are then used by the system positioning services layer to provide a graphical user interface (GUI) to the end-user which allows the end-user to visualize the current and predicted positioning of the system, and to configure and control the system. An exemplary system positioning service that may be derived from the results of the mash-up functions may include a position reporting service which indicates the power, performance and operational costs imposed on the system under given parameters. Other system positioning services may include destination searching services which query the system to automatically determine the management configurations that would lead to a user-specified status point, or autopiloting services which automatically apply optimal management configurations to the system using sensitivity based optimization techniques described in further detail below.

The layered architecture described herein for managing a virtualized data center provides declarative data center management capabilities to an end-user. It permits the end-user to specify some new requirement or desired state in a declarative manner and have the data center management system automatically modify the appropriate configuration and processes to achieve the specified state. This type of declarative data center management functionality significantly reduces the complexity associated with operating a data center, and enables faster operation for administrators by providing decision supporting information. It further allows for the enforcement of Service Level Agreements (SLAs) through performance management, and serves as an important technology component for green information technology (IT) which tends to utilize private clouds to consolidate old IT systems in enterprise data centers.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram illustratively depicts a data center management system 100 in accordance with the present principles. As illustrated therein, a middleware system 110 is situated between an end-user 101 (e.g., data center administrator) and a data center 160. The middleware system 110 can estimate the status of the data center 160 under certain conditions. The middleware system can also determine a set of configuration settings that will drive the data center 160 to a specified input state, and further implement the configuration settings to control the operation of the data center 160 in terms of power and performance.

The middleware system 110 can control the data center 160 by manipulating the power management component 152 and the performance management component 153. This may include reading in and utilizing data from the configuration and monitoring database 151. This database 151 stores settings and parameters associated with the current performance and power levels of the machines running at the data center 160. For example, the database 151 can store data indicating the CPU utilization of all virtual machines running at the data center 160.

The middleware system 110 comprises a set of system positioning services 120, a set of mash-up applications 130 and a system configuration compiler 140. The system configuration compiler 140 may implement two primitive functions, e.g. API-Get( ) and API-Put( ), that may be exploited to provide system positioning services 120 to end-users 101. The API-Get( ) function receives workload and system parameters as input and determines where the system would be located in terms of power, performance and operational cost if the workload and system settings were implemented at the data center 160. The API-Put( ) function permits a desired service configuration (e.g., a desired level of service) to be specified and then determines how the system should be configured to implement the specified service configuration at the data center 160. A more detailed explanation of these two illustrative functions is provided with reference to FIGS. 3 and 4 below.

The mash-up applications 130 represent management subtasks that can be built on top of the two API functions to perform a variety of operations and to make various types of determinations. These functions are designed to ask "what-if" questions that may be used in providing system positioning services 120. A mash-up application is not limited to using the information obtained from the two API functions, but may also use the results produced by other mash-up applications. Exemplary mash-up applications 130 may perform the following functions: system status prediction, feasibility zone analysis, impact analysis applications, and map generation.

A system status prediction (SSP) mash-up application makes predictions as to the expected status of the system in different workload scenarios. In making the predictions, the application may utilize the API-Get( ) function in conjunction with simulation components (e.g., the performance management component simulator 260 and power management component simulator 270 depicted in FIG. 2) embedded in the system configuration compiler 140. In certain embodiments, the system status prediction mash-up application may also allow the creation of a multi-expert workload prediction service to end users 101.

A multi-expert workload prediction service predicts the future workload of a data center 160 utilizing opinions from multiple experts. The plurality of expert opinions can be specified through user inputs or by offering workload forecasting procedures. While the experts may give different opinions at the workload level, the SSP application enables visualization of those opinions in terms of system performance and power cost, and therefore makes the opinions more intuitive and understandable to end users 101.

A feasibility zone analysis (FZA) mash-up application may also be provided which determines an acceptable or permitted status space that the system may operate in given a workload scenario and specified SLAs. The application may return a two-dimensional (in terms of performance and power costs) square-shape area defined by four coordinate points on a graph to indicate the feasibility zone. In this case, the status points inside the square would represent the feasibility zone, while the status points outside the square would indicate status points that are not reachable, either due to a performance constraint (e.g., <5% server overload time) or a physical resource limitation (e.g., maximally 200 servers in the resource pool).

A map generation (MG) mash-up application can indicate the system position in terms of power, performance and operation costs for some configuration setting and a specified workload. More specifically, this application can utilize the API-Put( ) function and the feasibility zone application to generate a map of (m*n)-sized grid, where each grid point corresponds to the system position for some configuration setting and a specified workload. In one embodiment, the feasibility zone is partitioned equally into (m−1) ranges between the minimum and maximum power cost defined in the feasibility zone. For each power cost on a range point, the API-Put( ) function is used to get n points each having different performance and operation costs.

Even further, other mash-up applications 130 may include impact analysis (IA) applications which post-process results from the API-Put( ) function to ascertain further information for end-users. For example, an IA mash-up application can post-process the operation cost report from the API-Put function that includes the resulting Virtual Machine (VM) migrations and the involved VMs, servers, and applications running on the VMs. It can further output an analysis report indicating how those VM migrations will impact the data center(s) 160. For example, the analysis report may indicate the network traffic caused by the migrations, the service downtime of applications running in the VMs, and other related factors. Various other types of mash-up applications 130 may also be employed with the present principles.

The results generated by the various mash-up applications 130 can then be used by the system positioning services 120 to provide a graphical user interface (GUI) to the end-user 101 which allows the end-user 101 to visualize the historical, current and predicted positioning of the system, and to configure and control the system (e.g., by controlling the power and performance settings at the data center 160). The system positioning services 120 may be used in real time to actively control and manage the data center 160, or can be used as offline decision supporting tools that makes determinations or predictions using resource utilization data from a separate source comprising history data or a public data center trace.

The system positioning services 120 depicted in FIG. 1 comprise a position reporting module 121, a destination searching module and an auto-piloting module 123. However, other related positioning services may also be included.

Figure 5:
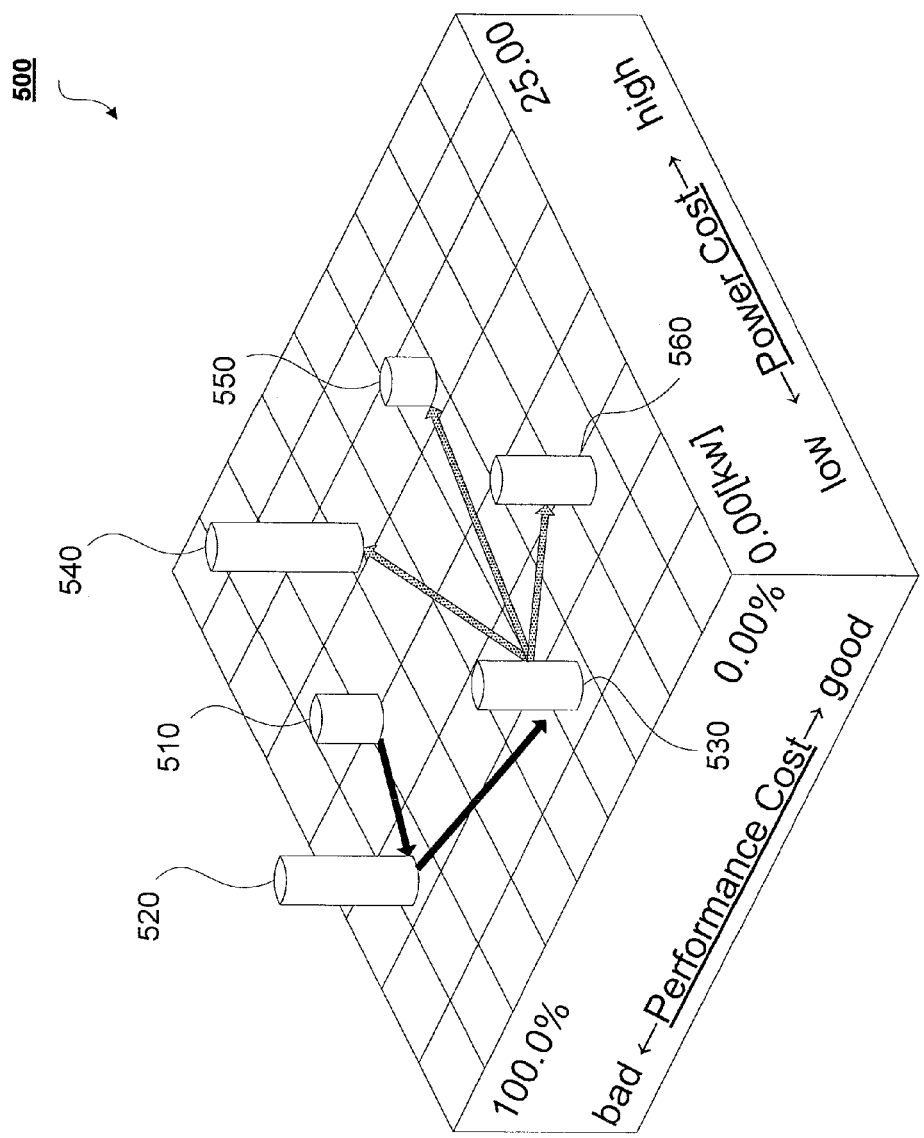
FIG. 5 is a graphical user interface illustrating a position reporting function in accordance with the present principles.

The position reporting service 121 determines the power, performance and operational costs imposed on the system under a given set of parameters. It is similar to the tracking function in GPS devices, and is built on top of the system status prediction mash-up application described above. The position reporting service 121 may provide a visual report which indicates how the system status has changed over history, the present status of the system, and a few different possibilities as to where the system may proceed in the future. This information may be presented to the end-user 101 via a three-dimensional map reflecting the power, performance and operation costs imposed on the system (e.g., as illustrated in FIG. 5).

The destination searching function 122 queries the system to automatically determine the management configurations and settings that are to be adjusted if a specified status state is to be implemented at the data center 160. Hence, this function permits an end-user 101 to specify a desired status state of the system without having to specify the configurations and settings that are needed to reach the desired state. Upon specifying the status state, the system automatically determines an appropriate set of configurations settings that can be used to drive the system to the status state. This function can be built on top of the API-Put( ) function and utilize data ascertained from the feasibility zone and impact analysis mash-up applications.

The auto-piloting service 123 can be used when the system is operated as a run-time management engine which automatically applies optimal management configurations to the system. Specifically, the auto-piloting service 123 applies optimal configuration settings to the system at the end of each consolidation epoch using, e.g., a sensitivity based optimization technique. These optimal configuration settings may be defined in the context of the following performance/power optimization problem: min Energy(configurations) subject to Performance(configurations)<=$P_{th}$, where $P_{th}$ is the upper bound of the performance cost (possibly specified by end users 101).

The auto-Piloting service requires a map of (m×n)-sized grid. As stated in [0034], each grid point g corresponds to the system status position for a configuration setting candidate ($CPU^g_{low}$, $CPU^g_{high}$) under a specified workload. Specifically, the feasibility zone is partitioned equally by the destination searching service into (m×1) sub-ranges along the power cost dimension, and for each of the m power cost points, the API-Put( ) function is applied to get n points which have different performance and operation cost.

The pseudocode presented below illustrates an exemplary manner of implementing the auto-piloting service 123.

Pseudocode for Auto-Piloting Service

---

Input: (m × n)-grid map, each grid node g represents a configuration setting candidate ($CPU^g_{low}$, $CPU^g_{high}$); migration cost threshold t
Output: management configurations ($CPU^*_{low}$, $CPU^*_{high}$)
Procedure:

1. Prune all grid nodes with migration cost > t in the map
2. If no node remains, return the current configuration
3. Else, for the remaining grid nodes, calculate the cost sensitivity on each node x with the configuration ($CPU^x_{low}$, $CPU^x_{high}$) as:

$$-\text{Sensitivity}(x) = \left| \frac{\frac{\Delta Performance_{cost}}{\Delta CPU^x_{low}}}{\frac{\Delta Ppower_{cost}}{\Delta CPU^x_{low}}} - \frac{\frac{\Delta Performance_{cost}}{\Delta CPU^x_{high}}}{\frac{\Delta Ppower_{cost}}{\Delta CPU^x_{high}}} \right|$$

4. Pick the grid node x with the minimal Sensitivity(x) value, return ($CPU_{low}^x$, $CPU_{high}^x$).

---

The above-identified variables can be defined as follows:

t: a threshold value reflecting the maximum allowable migration cost (e.g, number of VM migrations) of the data center.

$CPU^*_{low}$: the optimal value of the configuration parameter $CPU_{low}$ which solves the above performance-power optimization problem.

$CPU^*_{high}$: the optimal value of the configuration parameter $CPU_{high}$ which solves the above performance-power optimization problem.

x: indicates a particular node in the grid map (e.g., all grid nodes may be indexed 1, 2, . . . m×n), which corresponds to a configuration setting candidate ($CPU^x_{low}$, $CPU^x_{high}$).

$$\frac{\Delta Performance_{cost}}{\Delta CPU^x_{low}}:$$

indicates the value of the partial derivative of the function $Performance_{cost}$ with respect to the variable $CPU_{low}$ when $CPU_{low} = CPU^x_{llow}$.

$$\frac{\Delta Performance_{cost}}{\Delta CPU^x_{high}}:$$

indicates the value of the partial derivative of the function $Performance_{cost}$ with respect to the variable $CPU_{high}$ when $CPU_{high} = CPU^x_{high}$.

$$\frac{\Delta Ppower_{cost}}{\Delta CPU^x_{low}}:$$

indicates the value of the partial derivative of the function $Power_{cost}$ with respect to the variable $CPU_{high}$ when $CPU_{high} = CPU^x_{high}$.

$$\frac{\Delta Ppower_{cost}}{\Delta CPU^x_{high}}:$$

indicates the value of the partial derivative of the function $Power_{cost}$ with respect to the variable $CPU_{high}$ when $CPU_{high} = CPU^x_{high}$.

Using the above procedure, the auto-piloting service 123 can automatically control the power and performance levels that the data center 160.

As explained above, the power and performance levels at the data center 160 can be controlled by the performance and power management components 152 and 153. To determine when power or performance adjustments should be made at the data center 160, the management components may store an over-utilized machine list, which indicates all machines with that are in violation of a parameter specified by a service-level agreement (SLA), and an under-utilized machine list, which indicates all machines whose total CPU utilization is below a target lower bound (referred to herein as $CPU_{low}$). These lists can be used by the management components 152 and 153 to enforce power and performance configurations at the data center 160.

Enforcing power and performance configurations at the data center 160 may include migrating virtual machines running on the over-utilized machines to machines in the under-utilized list. To prevent an unnecessary virtual machine migration due to a transient glitch, an SLA violation may be defined to occur when more than 5% of the CPU utilization readings in a previous window are higher than a load threshold (e.g., 90%). The performance management component 153 may ensure that the total CPU utilization on each physical server is below the load threshold. It can periodically read in data from the database 151 which indicates the CPU utilization of all the virtual machines running at the data center 160, and check if the total utilization on a physical host is under the SLA threshold. If the performance manager 153 detects an SLA violation, it may resolve the violation by migrating virtual machines to physical machines that are included in the under-utilized machine list. In the case that the performance manager 153 determines that the available processing power from the under-utilized machines is insufficient, it can turn on additional machines at the data center 160.

In resolving an SLA violation, the performance manager 153 iterates through the virtual machines executing on each of the over-utilized machines until all of the over-utilized machines are under the SLA threshold. After iterating through all of the over-utilized machines, the power manager component 152 can determine a VM migration plan which indicates the destination for each VM. If there is not enough CPU processing power available to accommodate the VMs on the over-utilized machines, the performance manager 153 calculates the number of additional machines that will be turned on and powers on these extra machines via a wake-on-LAN.

A goal of the power manager 152 is to ensure that the total utilization for each physical server is at least higher than some threshold to prevent too much waste. Similar to the performance manager 153, the power manager 152 periodically checks the physical hosts to find machines whose total CPU utilization is lower than a threshold. The power manager 152 also maintains a list of under-utilized machines and tries to resolve the under-utilization by consolidating VMs and powering off machines. The power manager 152 iterates through the machines in the under-utilization list starting with the least utilized machine, and finds a destination host for each VM executing on that host. This component 152 then executes the VM migration plan and powers off machines that do not having any running VMs.

The power manager 152 can utilize two particularly useful parameters: minimal machines, which indicates a minimum number of physical machines that must be turned on at all times, and maximal VMs per machine, which indicates a maximum number of VMs that can be executing at once on a physical machine. The power manager 152 ensures that a minimal number of machines are always turned on so that some machines will always be running even when there is low overall CPU demand. When consolidating VMs to save power, the power manager 152 will also ensure that the number of VMs running on a machine does not exceed a maximum number.

Figure 2:
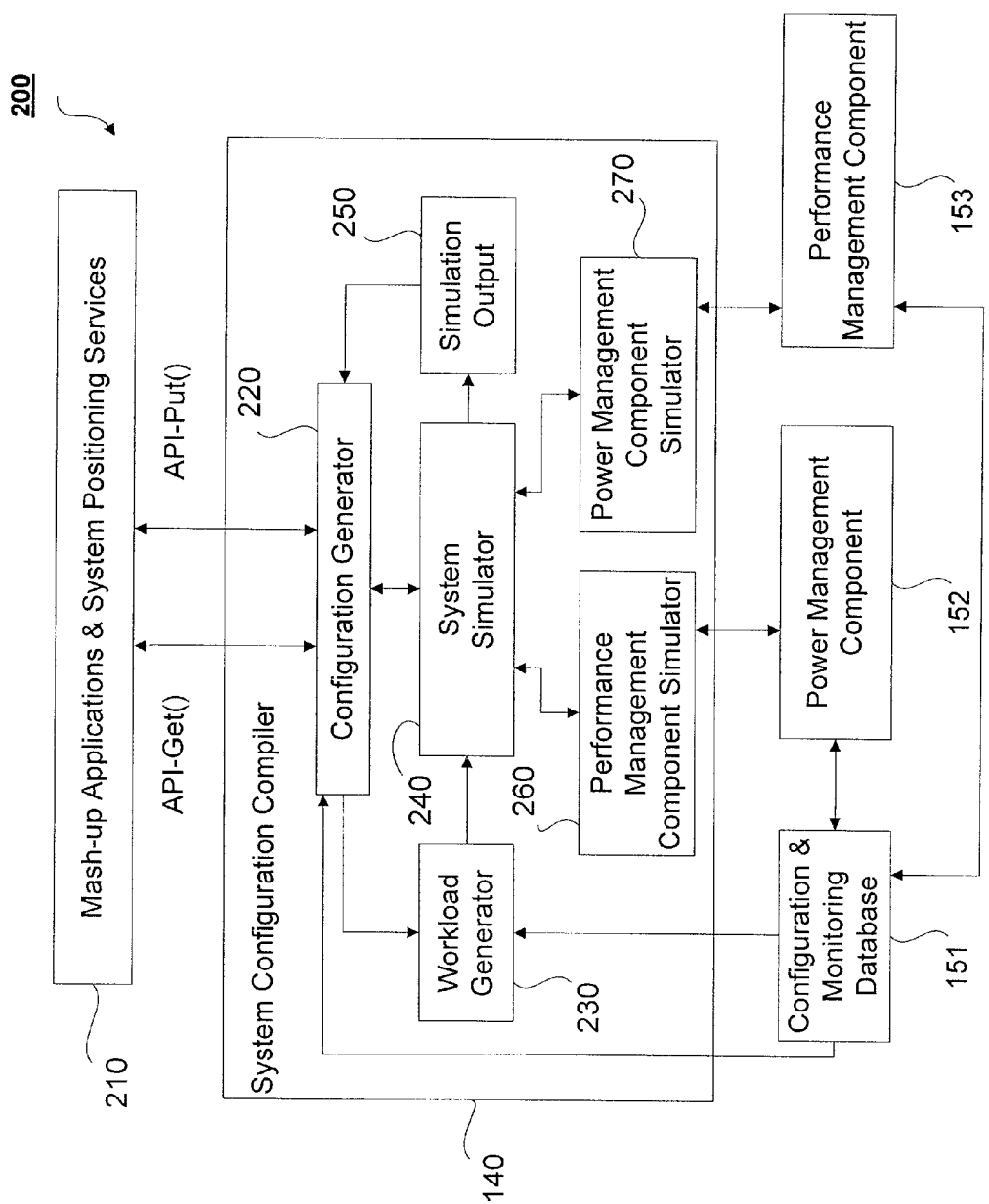
FIG. 2 is a block/flow diagram illustrating a more detailed view of the system configuration compiler depicted in FIG. 1.

Referring now to FIG. 2, a block/flow diagram 200 is disclosed which illustrates a more detailed view of the system configuration compiler 140 depicted in FIG. 1. As shown therein, the mash-up applications and system positioning services 210 request the results of the API-Get( ) and API-Put( ) functions from the system configuration compiler 140 (specifically, the configuration generator 220) to implement higher level tasks. Upon receiving these requests, the system configuration compiler 140 utilizes the input parameters associated with these functions to implement the functions, and subsequently returns the results of these functions to the mash-up applications and system positioning services 210 for further processing.

The configuration generator 220 drives the configuration compiler engine. The configuration generator 220 receives the calls to the two API functions, decides how to transfer them into internal subtasks in the compiler 140, and schedules the execution of the subtasks to implement the called functions.

The workload generator 230 receives a specified time period from the configuration generator 220 and reshapes the information in the configuration and monitoring database 151 during the time period. The output of the workload generator is a set of time series for virtual machine load information. One time series for one virtual machine x is in the format of $(X_1, X_2, \ldots, X_b \ldots )$, where $X_i$ is a load value (e.g., CPU utilization) of x at some time point. The system simulator will replay the VM load by reading the time series one point after another, in the same manner that the performance and power components 152 and 153 read the monitoring data in the production system.

A variety of different of different reshaping schemes may be used by the workload generator 230 to transform the data in the database 151. A first reshaping scheme adjusts the load of each executing virtual machine by a specified percentage. Thus, a specified percentage of 0% leads to no change in the data, while a specified percentage of +20% would increase the load on each virtual machine by 20% within the time period. The second reshaping scheme does not take any input parameters, but runs a regression-based load prediction procedure which outputs a predicted load.

The system simulator 140 is a discrete-event simulator which outputs the estimated system status on the server-level, as well as detailed configuration settings which would enable a specified input state to be achieved. To generate this information, the system simulator 240 includes data structures and logic functions to simulate per-server resource utilization information (e.g., utilization of CPU, memory, disk, I/O, etc.) which is based on the time-series input from the workload generator 230. In a preferred embodiment, the system status is simulated on the server-level. The simulation output component 250 records the output of the system simulator 240.

The system simulator 240 also includes event registers which are used to indicate whether the management component simulators (i.e., performance management component simulator 260 and power management component simulator 270) should be called upon to implement changes in performance and/or power. For example, if a server overload is detected during the system simulation process, the performance management component simulator 270 may be called upon to determine corresponding management actions that the system simulator 240 can execute to rectify the problem. Independently, a timer register could trigger the call to the power management component simulator 270 to execute periodic server consolidations. Throughout these consolidations, the server performance and behavior information is collected and analyzed, and then output as the status of the system (e.g., the average percentage of time there is server overloading at the data center 160, or the average estimated power consumption of the data center 160).

As indicated above, the performance management component simulator 260 and power management component simulator 270 adjust the power and performance levels of the simulation produced by system simulator 240, thus imitating the role that the performance management component 153 and power management component 152 play with respect to altering the actual power and performance levels at the data center 160. These components 260 and 270 encode the logic functions of the physical management components 152 and 153 based on domain knowledge, and interact with the system simulator 240 to reproduce the impact of management operations on the system status.

Figure 3:
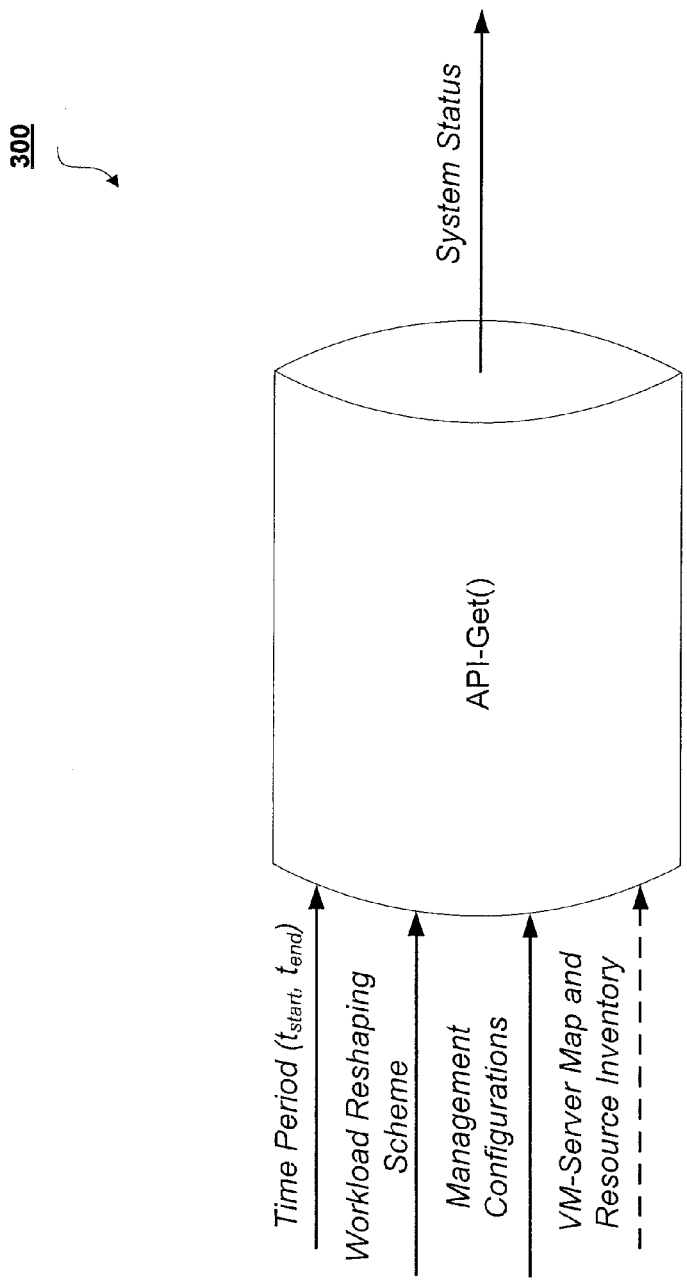
FIG. 3 is a graphical depiction of an exemplary API-Get( ) function in accordance with the present principles.

A more detailed description of the API-Get( ) and API-Put( ) functions will now be given with reference to FIGS. 3 and 4. As indicated above, the API-Get( ) function 300 provides a report on where the system would be located (e.g., in terms of power, performance and operational cost) if certain workload and system settings were implemented at the data center 160. Three input parameters are provided to the API-Get( ) function, with an optional fourth input parameter indicated by the dotted arrow:

(1) Time Period ($t_{start}$, $t_{end}$): This parameter set specifies the interested time period when the virtual machine workload will be used for system status calculation. The time period comprises a time duration in history when the system/workload monitoring information is available.

(2) Workload Reshaping Scheme: This parameter provides the option to apply different forecasting schemes on the original workload data during the time period. For example, this parameter may indicate the particular reshaping scheme which is implemented by the workload generator 230 described above.

(3) Management Configurations: This parameter set specifies the interested management policy settings. The configurations may include the CPU load control range [$CPU_{low}$, $CPU_{high}$]. The actual system configurations during the time period ($t_{start}$, $t_{end}$) may be used as default values.

(4) VM-Server Map and Resource Inventory: This is an optional parameter set which specifies the physical resource information. The VM-server map specifies the initial virtual machine hosting information, and the resource inventory includes information which indicates the available resources. The system information at time $t_{start}$ may be used as a set of default values if this parameter is not specified.

Based on the above-identified input parameters, the API-Get( ) function outputs the system status. The output system status parameter may describe the system location in a virtual coordinate space, similar to the manner in which a GPS device indicates a longitude/latitude coordinate space in the geographical world (e.g., as illustrated in FIG. 5). For integrated power and performance management, the system status can be defined using four metrics:

(1) Performance Cost: This metric reflects the service performance when the system is configured by the input parameters. While many cost metrics can be applied, the server overload time is the preferred cost metric in certain embodiments.

(2) Power Cost: This metric reflects the power consumption when the system is configured by the input parameters (e.g., the total power in kilowatts consumed by servers).

(3) Operation cost: This metric reflects the impact on the system due to management operations when the system is configured by the input parameters. In one embodiment, the number of VM migrations may be used to represent the operation cost. In addition to operation cost, detailed operation actions may also be returned indicating the scheduling of virtual machine migrations and server on-off activities.

(4) Stability: This metric reflects the effectiveness of the management configurations from another angle. In a preferred embodiment, the operation stability is defined as the percentage of time that the server workload falls within the CPU load control range [$CPU_{low}$, $CPU_{high}$] given the specified input parameters. High operation stability implies efficient workload distribution and low operation cost as few management events are triggered.

Figure 4:
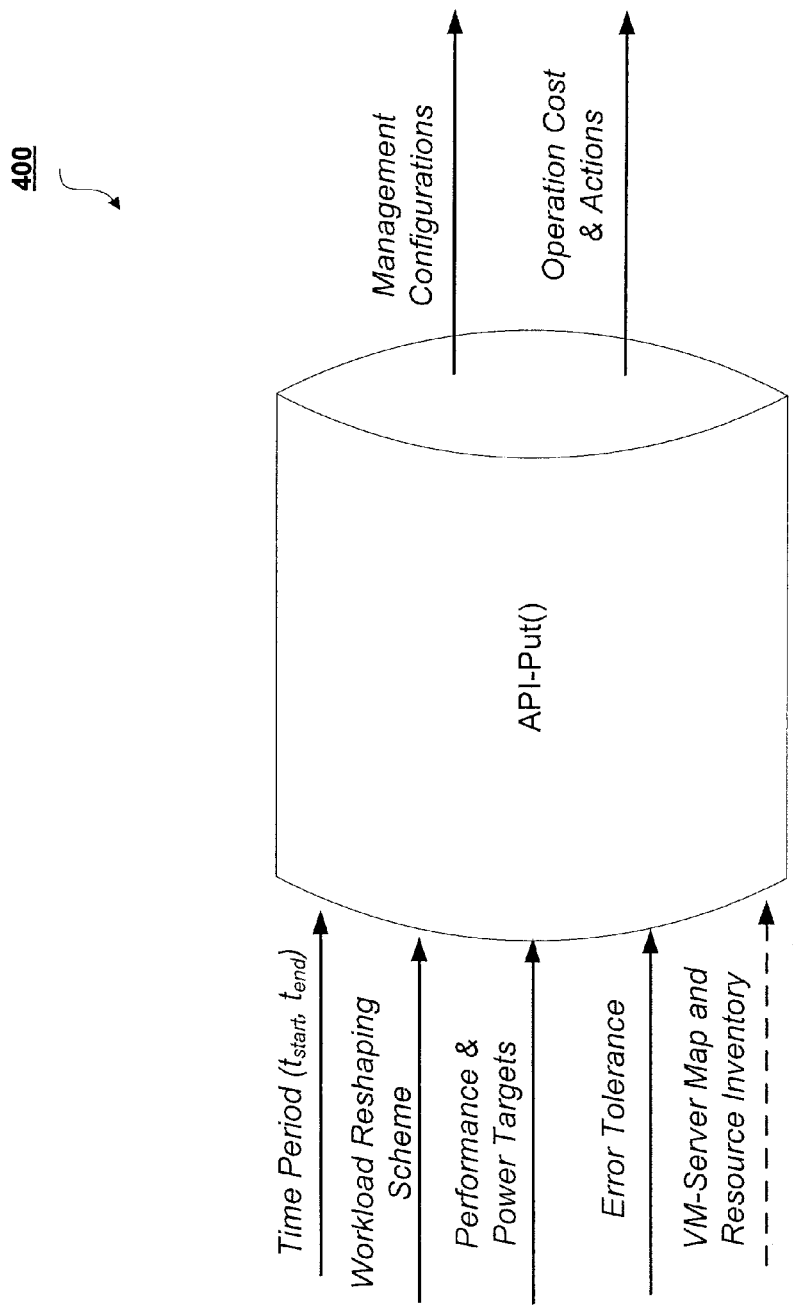
FIG. 4 is a graphical depiction of an exemplary API-Put( ) function in accordance with the present principles.

Moving on FIG. 4, the second API function 400, i.e., API-Put( ), is illustratively depicted. As explained earlier, the API-Put( ) function determines a set of management policies and configuration settings that will permit the system to reach a specified input status. Many of the same parameters that were utilized in implementing the API-Get( ) function are also used in implementing the API-Put( ) function. The above descriptions of these parameters remain the same for the API-Put( ) function, and therefore will not be reproduced in describing the API-Put( ) function.

The API-Put( ) function receives four input parameters, with an optional fifth input parameter indicated by the dotted line. Like the API-Get( ) function, the API-Put( ) function receives input parameters indicating a time period ($t_{start}$, $t_{end}$), a workload reshaping scheme, and possibly a VM-sever map and/or resource inventory. This function also receives two other inputs:

(1) Performance and Power Targets: These parameters indicate the system performance and power cost targets for which the API-Put( ) function generates configuration settings to achieve. In other words, these targets represent the specified status state that the API-Put( ) function attempts to drive the system toward by generating the appropriate settings.

(2) Error Tolerance ($\epsilon$&$\alpha$): This parameter specifies the allowable errors that may occur when the API-Put( ) function is searching for the destination status state.

Using the above input parameters, the API-Put( ) function generates two separate outputs. The first output is the management configurations and settings (described above) that will drive the system to the specified system status. The second output is the operation costs and actions (described above) reflecting the impact on the system due to management operations when the system is configured by the input parameters.

The configuration generator 220 in the system configuration compiler 140 includes an efficient destination searching procedure for the finding the solution of API-Put( ) calls. The pseudocode presented illustrates this procedure:

Pseudocode for Destination Searching Procedure

---

Input: ($t_{start}$, $t_{end}$), workload reshaping scheme, Performance$_{target}$, Power$_{target}$, error tolerance ($\epsilon$&$\alpha$), [VM-server map, resource inventory]
Output: management configurations ($CPU_{low}$, $CPU_{high}$), operation cost and actions
Procedure:
1. Assign $CPU_{low}$ = $CPU_{max}$, $CPU_{high}$ = $CPU_{max}$;
2. (Performance$_{cost}$, Power$_{cost}$) = get_position($CPU_{low}$, $CPU_{high}$, $t_{start}$, $t_{end}$, workload reshaping scheme, [VM-server map, resource inventory]);
3. If Power$_{cost}$ > Power$_{target}$, then a subset of servers has been turned off forcedly to meet Power$_{target}$;
  (a) (VM-server map, resource inventory) = forced_down(Power$_{target}$, $t_{start}$, [VM-server map, resource inventory]);
  (b) Power$_{cost}$ = Power$_{target}$, $CPU_{low}$ = $CPU_{max}$;
4. Else; //start binary searching for $CPU_{low}$
  (a) $CPU_{left}$ = $CPU_{min}$, $CPU_{temp}$ = $CPU_{low}$, $CPU_{right}$ = $CPU_{low}$;
  (b) while ($CPU_{left}$ < $CPU_{right}$)
  (c)   $CPU_{temp}$ = ($CPU_{left}$ + $CPU_{right}$) / 2;
  (d)   (Performance$_{cost}$, Power$_{cost}$) = get_position($CPU_{temp}$, $CPU_{high}$, $t_{start}$, $t_{end}$, workload reshaping scheme, [VM-server map, resource inventory]);
  (e)   If (Power$_{cost}$ > Power$_{target}$ + ($\epsilon$/2)
  (f)     $CPU_{left}$ = $CPU_{temp}$ +1; $CPU_{low}$ = $CPU_{temp}$;
  (g)   Else if (Power$_{cost}$ > Power$_{target}$ − ($\epsilon$/2)
  (h)     $CPU_{right}$ = $CPU_{temp}$ − 1; $CPU_{low}$ = $CPU_{temp}$;
  (i)   Else; //find the configuration $CPU_{low}$
  (j)     $CPU_{low}$ = $CPU_{temp}$; break;
5. $CPU_{left}$ = $CPU_{low}$, $CPU_{temp}$ = $CPU_{high}$, $CPU_{right}$ = $CPU_{high}$;
  (a) while ($CPU_{left}$ < $CPU_{right}$) //start binary searching for $CPU_{high}$
  (b)   (Performance$_{cost}$, Power$_{cost}$) = get_position($CPU_{low}$, $CPU_{temp}$, $t_{start}$, $t_{end}$, workload reshaping scheme, [VM-server map, resource inventory]);
  (c)   If (Performance$_{cost}$ < Performance$_{target}$ − ($\alpha$/2))
  (d)     $CPU_{left}$ = $CPU_{temp}$ + 1;
  (e)     $CPU_{temp}$ = ($CPU_{left}$ + $CPU_{right}$) / 2; $CPU_{high}$ = $CPU_{temp}$;
  (f)   Else if (Performance$_{cost}$ > Performance$_{target}$ + ($\alpha$/2))
  (g)     $CPU_{right}$ = $CPU_{temp}$ − 1; $CPU_{high}$ = $CPU_{temp}$;
  (h)   Else; //find the configuration for $CPU_{high}$
  (i)     $CPU_{high}$ = $CPU_{temp}$; break;
6. Return ($CPU_{low}$, $CPU_{high}$), and the corresponding operation cost & actions.

---

The steps include a procedure for finding $CPU_{low}$ that leads to the desired Power$_{target}$, and another procedure for finding $CPU_{high}$ that leads to the desired Performance$_{target}$. Note the (Performance$_{target}$, Power$_{target}$) specification might not be a feasible status. In this case, this input is first filtered out using the feasibility zone information, and the status point closest to the input target is returned if it passes the filtering process.

These details are not included in the pseudocode example provided above for purposes of reducing complexity.

The above-identified variables which have not be defined yet, may be defined as follows:

$CPU_{max}$: indicates the maximum CPU utilization that is permissible under the constraints imposed by the inputs listed above.

$CPU_{min}$: indicates the minimum CPU utilization that is permissible under the constraints imposed by the inputs listed above.

Performance$_{target}$: indicates the performance level which the destination searching procedure is trying to drive the data center towards.

Power$_{target}$: indicates the power level which the destination searching procedure is trying to drive the data center towards.

$CPU_{left}$: a temporary variable used in the searching procedure.

$CPU_{right}$: a temporary variable used in the searching procedure.

$CPU_{temp}$: a temporary variable used in the searching procedure.

$\epsilon$: indicates the acceptable level of error for power costs.

$\alpha$: indicates the acceptable level of error for performance costs.

To understand the correctness and convergence of the searching procedure, consider the three properties described below and Theorem 1.

Property 1: In a homogeneous system, Performance$_{cost}$($CPU_{high}$) is a non-decreasing function of $CPU_{high}$.

This property explains that in a homogeneous system, the performance cost typically increases along with higher $CPU_{high}$ given the same workload. Hence, the lower the value is of $CPU_{high}$, the more load balanced the system will be, thus leading to lower performance violations.

Property 2: In a homogeneous system, Power$_{cost}$($CPU_{low}$) is a non-increasing function of $CPU_{low}$.

This property explains that in a homogeneous system, the power cost typically decreases along with higher $CPU_{low}$ given the same workload. Hence, the higher the value is of $CPU_{low}$, the more aggressive the load consolidation in the system will be, thus leading to less power consumption.

Property 3: In a homogeneous system, Operation$_{cost}$($CPU_{high}$−$CPU_{low}$) is a non-increasing function of ($CPU_{high}$−$CPU_{low}$) for a fixed $CPU_{high}$ or $CPU_{low}$.

This property explains that in a homogeneous system, the operation cost typically decreases along with wider load control range ($CPU_{high}$−$CPU_{low}$) given the same workload. Hence, the more tolerable the system is to load variation, the less frequent the operation management system will have to take effect.

Theorem 1: The destination searching procedure finds the status destination in O(log R) steps, where R=$CPU_{max}$−$CPU_{min}$ is the allowable load control range.

Note the algorithm starts with the maximal $CPU_{low}$ and $CPU_{high}$, and searches in the order of the target CPU*low followed by CPU*high due to the constraint $CPU_{low} \leq CPU_{high}$.

Figure 6:
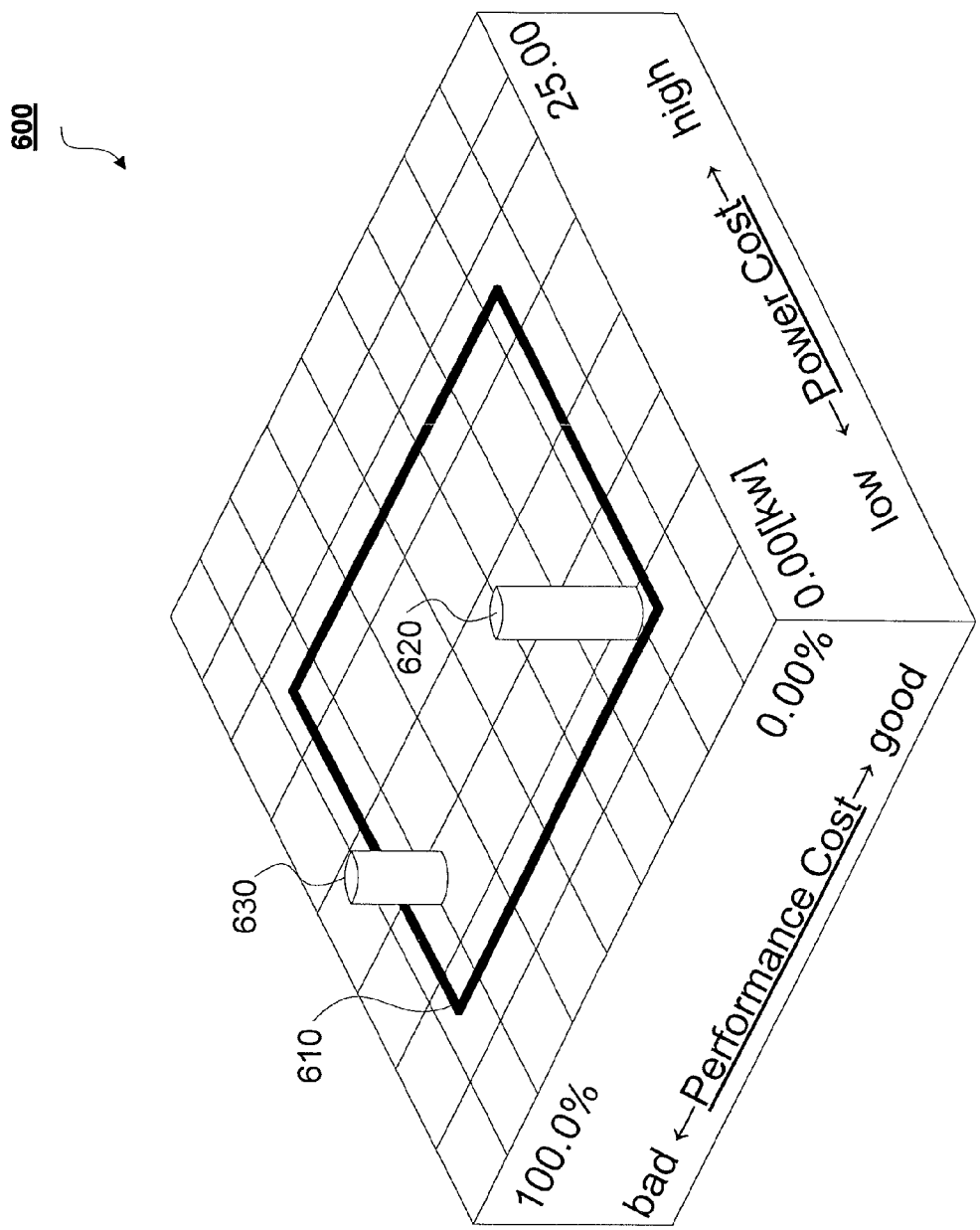
FIG. 6 is a graphical user interface illustrating a destination searching function in accordance with the present principles.

FIGS. 5 and 6 illustrate graphical user interfaces that can be provided to an end-user 101 in accordance with the present principles.

FIG. 5 illustrates a graphical user interface 500 for use with the position reporting function 121. The vertical bars 510, 520, 530, 540, 550 and 560 represent the status of the system at different points in time. The position of the vertical bars with respect to the axes represents the power and performance costs, while the height of the vertical bars represents the operational costs.

Vertical bar 530 represents the current status of the system, while vertical bars 510 and 520 represent previous states of the system derived from historical data (e.g., which may be stored in the configuration and monitoring database 151 described above). The solid arrows indicate how the system transitioned from previous state 510 to the current state 530.

As explained above, the position reporting function 121 can predict the status of the system under a given set of parameters. Since there may be a plurality of system states which satisfy the specified input parameters, the graphical user interface 500 may display multiple predicted futures states for the system. Vertical bars 540, 550 and 560 represent three predicted future states of the system. The non-solid arrows indicate the transition from the current state to each of the future states. In preferred embodiments, the three future states displayed on the graphical user interface represent predictions on how the system can be optimized in terms of power, performance and operation costs while still satisfying the constraints imposed by the input parameters.

FIG. 6 illustrates a graphical user interface 600 for use with the destination searching function 122. A target system status may be a system state with a different power consumption and/or performance violation which the end-user 101 would like the system to reach. However, the end-user 101 may not know exactly how to configure the system to reach this state. Thus, the graphical user interface can accept input information describing the target system state and forward this information to the system configuration compiler described above with reference to FIG. 2. Upon receiving the input, the system configuration compiler searches the configuration space to find possible configuration parameters which satisfy the target system state.

Since there may be multiple configuration parameters that satisfy the target system status, the GUI displays the possible choices of them. The square labeled 610 represents the feasible configuration parameters that can achieve the target system state. All status points which fall with this square 610 satisfy the target system state, while all status points outside the square 610 represent non-feasible states.

Vertical bars 620 and 630 represent two particularly notable status points which satisfy the target system status. Vertical bar 620 represents the system status which is minimized in terms of performance cost, while vertical bar 630 represents the status point which is minimized in terms of operational cost. Other vertical bars may be provided (e.g., a vertical bar indicates how the system can be configured to minimize power costs). Each choice includes information regarding the details of migration steps from the current state that are provided by the system simulator engine.

In the case when a target system status cannot be reached, the GUI shows the closest state the system can reach and the corresponding configuration parameters that are associated with the state.

Figure 7:
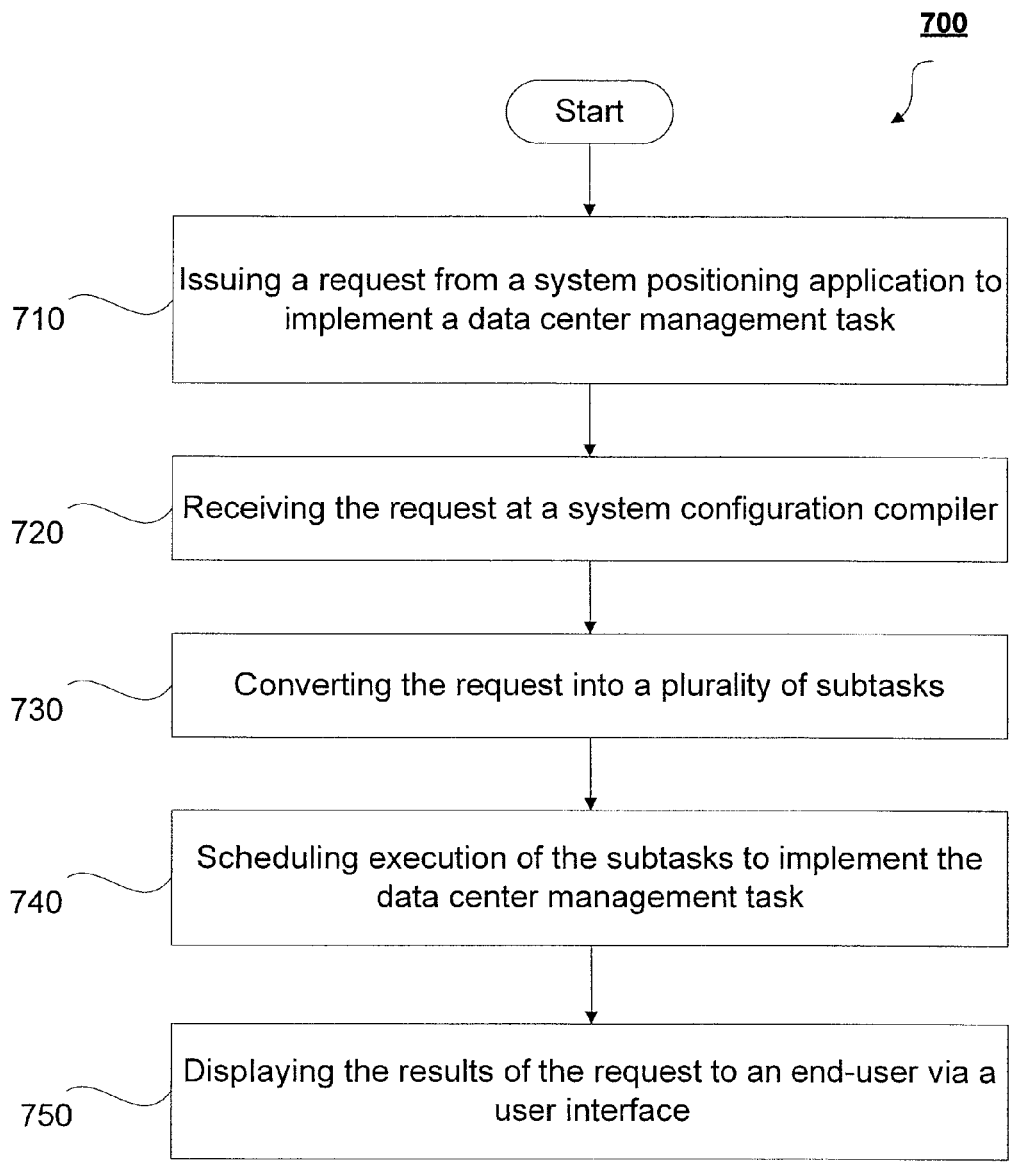
FIG. 7 is a block/flow diagram illustrating a method for managing a data center in accordance with the present principles.

Moving on to FIG. 7, a block/flow diagram illustrates a method for managing a data center in accordance with the present principles. The begins at the start block and proceeds to block 710 where a request is issued from a system positioning application (e.g., a position reporting application 121, a destination searching application 122 or an auto-piloting application 123) to implement a data center management task. The request may be issued by the system positioning application indirectly via the mash-up application layer 130. Exemplary data center management tasks may include determining the status of a data center 160 in terms of power, performance and operational costs given specified input parameters as described above, or may including generating a set of management policies that can drive the data center 160 to a particular state in terms of these costs.

Next, the request is received by a configuration generator in block 720, and converted into a plurality of subtasks (block 730). The conversion of the request into the subtasks may involve generating or determining the set of subtasks that can collectively be combined to provide a data center management task to an end-user 101. The subtasks may represent the functions performed by the components of the system configuration compiler 140 described above with reference to FIG. 2. For example, the subtasks may represent the data reshaping operations implemented by the workload generator 230 to transform the data in the configuration and monitoring database 151, or the server simulation operations performed by system simulator 240 for estimating the system status.

The set of tasks generated in block 730 are scheduled for execution in block 740. The execution of the tasks will provide the data center management task to the end user 101, and the results may be displayed to the end-user 101 via a graphical user interface (e.g., using the graphical user interfaces depicted in FIGS. 5 and 6) in block 750. The results may also be applied to implement changes at the data center 160 by applying the results on the configurations and settings of the performance and power components 152 and 153.

Having described preferred embodiments of a system and method for providing system positioning services in a data center (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for managing a data center, comprising:
a system positioning module stored on a computer readable storage medium comprising:
 a position reporting module configured to determine a status of a data center under specified configuration parameters;
 a destination searching module configured to receive a desired target state and automatically determine which configuration parameters that are to be adjusted if the desired target state is implemented at the data center; and
a system configuration compiler configured to receive a request from the system positioning module associated with a data center management task, convert the request into a set of subtasks, and schedule execution of the subtasks to implement the data center management task.

2. The system as recited in claim 1, further comprising a system simulator configured to simulate resource utilization data of a server using a set of input time-series, and further configured to output a predicted status of a data center.

3. The system as recited in claim 2, wherein the predicted status of the data center indicates performance, power and operational costs at the data center under a given set of parameters associated with a target state of the data center.

4. The system as recited in claim 1, further comprising a workload generator configured to receive a specified time period and transform data during the time period using a data reshaping scheme.

5. The system as recited in claim 1, wherein the position reporting module is capable of indicating a historical, present and predicted future status of the data center.

6. The system as recited in claim 1, wherein the system positioning module further comprises an auto-piloting module configured to automatically apply configuration settings to the data center using a sensitivity-based optimization technique to control the data center in terms of power and performance.

7. The system as recited in claim 1, further comprising a user interface configured to indicate a current status and a plurality of possible future statuses of the data center in terms of power, performance and operation costs.

8. The system as recited in claim 7, wherein the plurality of possible future statuses indicate optimal configurations of the data center in terms of power, performance and operation costs while satisfying constraints imposed by the configuration parameters.

9. The system as recited in claim 1, further comprising a set of mash-up applications which perform subtasks that can be used by the system positioning application, wherein the subtasks include functions for performing at least one of feasibility zone analysis and map generation.

10. A method for managing a data center, comprising:
sending a request associated with a system positioning application stored on a computer readable storage medium for at least one:
 determining a status of a data center under specified configuration parameters;
 determining configuration parameters that are to be adjusted if a desired target state is implemented at the data center; and
 implementing an auto-piloting service for automatically controlling the data center;
converting the request into a set of subtasks; and
scheduling execution of the subtasks to implement the request.

11. The method as recited in claim 10, further comprising simulating resource utilization data of a server using a set of input time-series and outputting a predicted status of the data center based on simulated data.

12. The method as recited in claim 11, wherein the predicted status of the data center indicates performance, power and operational costs at the data center under a given set of configuration parameters associated with a target state of the data center.

13. The method as recited in claim 10, further comprising receiving a specified time period and transforming data during the time period using a data reshaping scheme.

14. The method as recited in claim 10, wherein the system positioning application comprises a position reporting application which predicts the power, performance and operational costs imposed on the data center under a specified set of parameters.

15. The method as recited in claim 10, wherein the system positioning application comprises a destination searching application which automatically determines configuration parameters that are to be adjusted if the desired target state is implemented at the data center.

16. The method as recited in claim 10, wherein the system positioning application comprises an auto-piloting application which automatically applies configuration settings to the data center using a sensitivity-based optimization technique to control the data center in terms of power and performance.

17. The method as recited in claim 10, further comprising outputting a current status and predicted future status of the data center in terms of power, performance and operation costs.

18. The method as recited in claim 10, wherein the system positioning application utilizes a set of mash-up applications to implement the subtasks, and the subtasks comprise functions for performing at least one of feasibility zone analysis and map generation.

19. A computer readable storage medium comprising a computer readable program, wherein the computer readable program when executed on a computer causes the computer to perform the method recited in claim 10.

20. A system for managing a data center, comprising:
- a system positioning module stored on a computer readable storage medium comprising:
    - an auto-piloting module configured to automatically apply configuration settings to a data center using a sensitivity-based optimization technique to control the data center in terms of power and performance;
- a system configuration compiler configured to receive a request from the system positioning module associated with a data center management task, convert the request into a set of subtasks, and schedule execution of the subtasks to implement the data center management task.

* * * * *